Patented Jan. 14, 1936

2,027,855

UNITED STATES PATENT OFFICE 2,027,855

PROCESS FOR THE REGENERATION OF CATALYSTS

Ralph Lyman Brown, Syracuse, N. Y., assignor to Atmospheric Nitrogen Corporation, New York, N. Y., a corporation of New York No Drawing. Application October 4, 1932, Serial No. 636,253

6 Claims. (Cl. 23—238)

This invention relates to a process for the regeneration of spent tungsten oxide catalysts and particularly such catalysts which have been used for the catalytic synthesis of organic compounds from an aliphatic alcohol and carbon monoxide.

In my copending application Serial No. 636,251, Patent 1,998,219 issued April 16, 1935 are described various tungsten oxide catalysts for the catalytic synthesis of organic compounds from an aliphatic alcohol and carbon monoxide, for example, acetic acid from methanol and carbon monoxide.

These catalysts may gradually lose their activity when in use. This loss in activity appears to be due mainly to deposition of foreign material, such as carbon, metal particles, etc. on the catalyst (the so-called "fouling" of the catalyst), and/or a change in the physical or molecular condition of the hydrated tungsten oxide. The catalysts which have degenerated in activity during use show the characteristic of being relatively insoluble in aqua ammonia. For example, a degenerated catalyst was only slightly dissolved in boiling ammonium hydroxide containing initially 28% $NH_3$ even after being boiled with the ammonium hydroxide for four to five hours with replenishment of the $NH_3$ content of the solution.

I have found that the activity of such a catalyst may be regenerated, if the degenerated or spent catalyst material is treated to change it into a tungsten oxide material which is relatively soluble in ammonia. Thus the spent catalyst material may be subjected to a treatment which comprises heating it in an atmosphere of ammonia and steam to change it to a form relatively readily soluble in ammonia as distinguished from its relatively slightly solubility in the inactive fouled form as removed from the converter. I have further discovered by employing a strong base, sodium hydroxide solution for example, the degenerated catalyst material may be dissolved to form a solution from which tungsten oxide in a form which is soluble in ammonium hydroxide may be precipitated by the addition of an acid such as nitric acid. This precipitated tungsten oxide or the spent catalyst material which has been rendered soluble by treatment with ammonia and steam, may be dissolved in ammonium hydroxide to form ammonium tungstate and a regenerated active catalyst may be prepared from the ammonium tungstate, for example, by reaction with an acid such as nitric acid.

The following examples illustrate my invention:

*Example I.*—Tungsten oxide catalyst such as that described in my pending application Serial No. 636,251, when spent or fouled is heated in a current of ammonia and steam in the proportions by weight of about 28 parts ammonia to about 72 parts steam, at a temperature of about 150° C. for a sufficiently long period of time to convert the oxide into a form relatively soluble in ammonia. This treatment of the spent catalyst may continue for about 2½ hours, for example. After the ammoniation treatment the catalyst material, except for carbonaceous and other contaminating deposits, readily goes into solution when placed in ammonium hydroxide at room temperature and the mixture then heated to its boiling point. About 15 minutes is required for the dissolution of about 1 part of spent catalyst in about 20 parts of ammonium hydroxide. The resulting ammonia solution is then filtered to remove the insoluble carbonaceous or other contaminating material. A regenerated active tungsten oxide catalyst may then be obtained from this solution by the procedure described in my copending application above referred to, i. e., by precipitation by the addition of nitric acid, for example, to the ammonium tungstate solution heated to the boiling point or the solution may be concentrated to crystallize out more or less of the ammonium tungstate and the resulting mixture of solid and solution treated with nitric acid; as more particularly described in Examples I, II, or III of my aforesaid copending application, Serial No. 636,251.

*Example II.*—The spent or fouled tungsten oxide catalyst is dissolved in about 75% excess 1 to 2 normal NaOH solution. The resulting solution is filtered to remove carbonaceous or other contaminating material and is then acidified to precipitate tungsten oxide by the addition of about 100% excess nitric acid as concentrated acid containing 70% $HNO_3$. This precipitation is preferably carried out while the solution of the catalyst is heated and maintained at about 100° C. After addition of the acid, the mixture is boiled for 20 to 30 minutes to obtain a substantially complete precipitation of the tungsten in the form of the oxide in a pure condition. The precipitate is filtered off and washed with several portions of 0.5 N nitric acid. This precipitate, which is readily soluble in ammonia, is dissolved in ammonia, and a regenerated active tungsten oxide catalyst recovered therefrom as in Example I by precipitation with an acid such as nitric acid.

I claim:

1. The process for the regeneration of spent tungsten oxide catalysts which comprises heating the spent catalyst in an atmosphere of ammonia and steam to render the catalyst material soluble in ammonium hydroxide, dissolving the thus treated material in ammonium hydroxide and preparing an active catalyst material from the solution of ammonium tungstate thus obtained.

2. The process for the regeneration of spent tungsten oxide catalysts which comprises heating the spent catalyst at about 150° C. in an atmosphere of ammonia and steam containing about 28 parts of ammonia to 72 parts of steam to render the catalyst material soluble in ammonium hydroxide, dissolving the thus treated material in ammonium hydroxide and preparing an active catalyst material from the solution of ammonium tungstate thus obtained.

3. The process of converting a tungsten oxide material which is insoluble in ammonium hydroxide into a material soluble in ammonium hydroxide which comprises heating said insoluble material in an atmosphere of ammonia and steam.

4. The process of converting a tungsten oxide material which is insoluble in ammonium hydroxide into a material soluble in ammonium hydroxide which comprises heating said insoluble material at a temperature of about 150° C. in an atmosphere of ammonia and steam containing about 28 parts of ammonia and about 72 parts of steam.

5. The process for the regeneration of spent tungsten oxide catalysts which comprises dissolving the spent catalyst in a sodium hydroxide solution, acidifying the solution thus obtained to precipitate tungsten oxide therefrom, dissolving the precipitated tungsten oxide in ammonium hydroxide and acidifying the resulting solution to precipitate therefrom a catalytically active tungsten oxide.

6. The process for the regeneration of spent tungsten oxide catalysts which are relatively insoluble in aqua ammonia which comprises dissolving the spent catalyst in a solution of a strong base forming a soluble tungstate with the tungsten oxide, acidifying the solution thus obtained to precipitate tungsten oxide therefrom, dissolving the precipitated tungsten oxide in ammonium hydroxide and acidifying the resulting solution to precipitate therefrom a catalytically active tungsten oxide.

RALPH LYMAN BROWN.